з,342,678
LOWERING BLOOD CHOLESTEROL LEVELS IN WARM-BLOODED ANIMALS WITH PHENOXY-ETHOXY OR PHENOXY - PROPOXY AMINE DERIVATIVES

Frank M. Berger, Princeton, Friedrich Dürsch, Freehold, and Bernard J. Ludwig, North Brunswick, N.J., assignors to Carter-Wallace, Inc., a corporation of Maryland
No Drawing. Filed Feb. 10, 1964, Ser. No. 343,505
7 Claims. (Cl. 167—65)

The present invention relates to novel compositions and methods for lowering blood cholesterol. In a further aspect, this invention relates to novel aryloxyalkoxyamines and related compounds.

It is an object of this invention to provide novel compositions of matter which have the effect of lowering blood cholesterol upon administration of such compositions to warm-blooded animals. It is another object of this invention to provide a novel method for lowering blood cholesterol in warm-blooded animals. It is a further object of the invention to provide novel aryloxyalkoxyamine compounds which are effective as active ingredients in the aforementioned compositions. Other objects will become apparent to those skilled in the art in the light of the instant specification.

It has been found that some of the objects of the invention can be realized by providing a pharmaceutical composition comprising, as an active ingredient thereof, a pharmaceutically effective amount of a compound of the general formula:

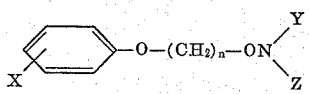

wherein X is selected from the group consisting of hydrogen, halogen and lower alkyl; n is an integer selected from the class consisting of 2 and 3; Y is selected from the group consisting of hydrogen,

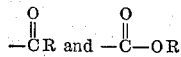

wherein R is selected from the group consisting of lower alkyl and aryl; and Z is selected from the group consisting of hydrogen, aralkyl and aryloxyalkyl. As used herein and in the appended claims, the term "lower alkyl" signifies an alkyl radical having from 1 to 6 carbon atoms. When the above compounds are primary or secondary amines, they may also be employed in the form of their physiologically acceptable salts such as the hydrohalides (preferably the hydrochloride), salts with other readily tolerated inorganic acids such as sulfuric or phosphoric acid, and salts with the commonly used organic acids such as acetic, citric, maleic, and tartaric acid.

Some of the novel compounds of the present invention can be prepared by the reaction of equimolar amounts of N-hydroxyurethane and the appropriate aryloxyalkyl halide in an alkali alcoholate solution according to the following reaction scheme:

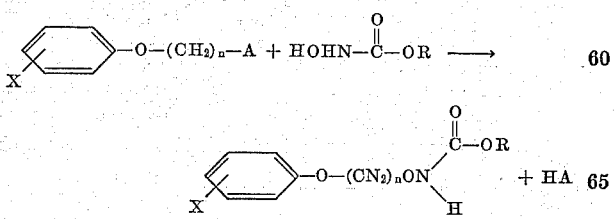

wherein X, R and n are as hereinbefore described and A is halogen. By the selection of the appropriate reactants, a number of aryloxyalkyl carboalkyl(aryl)oxyhydroxamate compounds of the present invention can be prepared in this manner.

The aryloxyalkoxyamines of the present invention can be prepared by alkaline hydrolysis of the corresponding aryloxyalkyl carboalkyl(aryl)oxyhydroxamate produced as hereinbefore described. If desired, these aryloxyalkoxyamines can be prepared from the corresponding aryloxyalkyl carboalkyl(aryl)oxyhydroxamates without isolation of the latter compounds by alkaline hydrolysis of the reaction mixture containing these compounds.

The aryloxyalkyl N-aralkyl carboalkyl(aryl)oxyhydroxamates of the invention can be produced by the reaction of an aralkyl halide with the appropriate aryloxyalkyl carboalkyl(aryl)oxyhydroxamate in an alkali alcoholate solution. These carboalkyl(aryl)oxyhydroxamates can be converted to the corresponding N-aralkyl and N-aryloxyalkyl aryloxyalkoxyamines by saponification.

By the use of a 2:1 molar ratio of aryloxyalkyl halide to N-hydroxy urethane in the condensation reaction described above, one can obtain aryloxyalkyl N-aryloxyalkyl carboalkyl(aryl)oxyhydroxamates which contain two identical aryloxyalkyl groups. These compounds can be saponified without isolation to give the corresponding N-aryloxyalkyl aryloxyalkoxyamines wherein the two aryloxyalkyl groups are identical.

The aryloxyalkoxyamines, N-arylalkyl and N-aryloxyalkyl aryloxyalkoxyamines prepared by the above methods can be converted to the corresponding aryloxyalkyl acyl(aroyl)hydroxamates, aryloxyalkyl N-aralkyl acyl(aroyl)hydroxamates and aryloxyalkyl N-aryloxyalkyl acyl(aroyl)hydroxamates by reacting with an appropriate acylating or aroylating agent.

Examples of aryloxyalkoxyamine compounds which are the preferred active ingredients of the present invention are shown in Table A given hereinafter. Examples of various types of aryloxyalkoxyamine compounds useful as the active ingredints of this invention, including the preferred active ingredients of Table A, are given in Table B given hereinafter.

As indicated hereinbefore, it has been found that the aryloxyalkoxyamine compounds used in accordance with this invention when taken internally have the effect of lowering the blood cholesterol content, e.g., the amount of cholesterol in the blood of the warm-blooded animal taking the active ingredients of the present invention. In forming the novel compositions of this invention, the active ingredient is incorporated in a suitable carrier such as, for example, a pharmaceutical carrier, beverage or foodstuff. Any suitable pharmaceutical carrier may be used for formulating the compositions of this invention, such as, for example, starch, lactose, glucose, sucrose, gelatin, powdered licorice, powdered marshmallow, powdered tragacanth, malt, rice flour, powdered althaea, magnesium carbonate, chalk, and the like. Among the liquid pharmaceutical carriers which may be utilized are ethyl alcohol, propylene glycol, polyethylene glycol, water, saline, glycerine and water mixture, glucose syrup, honey, mucilage of acacia, syrup of acacia, mucilage of tragacanth, glyceride of starch, etc. Also, the active ingredient may be incorporated in a food stuff such, for example, as incorporating it in butter, margarine and the like. The preferred carrier for a given active ingredient depends upon the desired use and nature of the active ingredient. For example, a liquid active ingredient is preferably administered in the form of a soft gelatin capsule containing a therapeutic dose of the active ingredient. A crystalline solid active ingredient is preferably administered in the form of a capsule or tablet. When the composition of this invention is in the form of a solid, the active ingredient is generally in an amount from about 25 to 95% by weight of the solid composition. When the composition of this invention is in the form of a solution, the active ingredient is generally in an amount of from about 0.1 gram to 90 grams per 100 grams of solution.

An in vivo technique which has been valuable in the determination of cholesterol lowering action of drugs is the procedure of Cuthbertson et al., 1959 (Brit. J. Nutrition, volume 13, page 227). Using the formulation given by these investigators, a stock Diet (A) which is essentially normal rodent diet comparable to that available from commercial feed dealers, and a special high fat Diet (B) are prepared. The "B" diet features 2% cholesterol; 0.5% cholic acid; and specially prepared hydrogenated arachis oil, 22%; also corn starch, 45,5%; crude casein, 25%; choline chloride, 1%; and salt and vitamin mixtures. The hydrogenated arachis oil specifies a 92° F. melting point with limits of 90–93° F. Drugs to be evaluated are added to Diet B at fixed graded concentrations in the diet, ranging from 0.125 to 2%. Male Charles River albino weanling rats weighing approximately 50 grams are placed in individual cages equipped with specially designed self-feeder devices which permit accurate determination of daily food intake. Groups of six animals, kept in individual cages, receive each of the concentrations of drugs. In addition, a group of six on the stock Diet A serves as a negative control, and a high fat Diet B group of six serves as a positive control. The rats are placed on the special diets for fourteen consecutive days, after which time one to three milliliter blood samples are obtained by intracardiac puncture, and subjected to assay for their cholesterol content. The animals serving as the negative control group (Diet A) maintain a cholesterol level in the normal range which is less than 100 mg./100 ml. of serum, whereas the positive control group (Diet B) show a marked elevated level of the order of 800 mg./100 ml.

The active ingredients used in accordance with this invention, when incorporated in Diet B following the above described Cuthbertson et al. method, exhibit a cholesterol lowering activity. In general, when such active ingredients are in concentrations of about 0.25 to about 0.5% in Diet B, the percent reduction in the blood cholesterol level is about 25% or more as compared to the positive control (Diet B) without the active ingredient. Thus, if a positive control group given Diet B shows a blood cholesterol level of about 800 mg./100 ml., the active ingredients of this invention, if incorporated in such Diet B, in a concentration of about 0.25 to about 0.5%, would generally reduce the blood cholesterol level of this positive group to about 600 mg./100 ml. or lower. Effective drugs usually show a direct relationship between the concentration of drug in the diet, and the percent reduction in the blood cholesterol levels as compared to the positive control (Diet B without drug).

A number of compositions found to exhibit outstanding activity in lowering blood cholesterol levels, when tested by the invivo procedure of Cuthbertson et al. method described hereinbefore in detail, are shown in Table A. In each instance, the carrier was Diet B containing the active ingredient in a concentration of 0.25%. The activity (percent cholesterol lowering) was obtained in the manner described hereinbefore, i.e. determining the percent reduction in the blood cholesterol levels by incorporating the active ingredient in Diet B as compared to Diet B without the active ingredient.

TABLE A

| No. | Compound | Percent Reduction |
|---|---|---|
| 2 | γ-Phenoxypropoxyamine hydrochloride | 44 |
| 8 | N-benzyl γ-phenoxypropoxyamine hydrochloride | 51 |
| 9 | N-(γ-phenoxypropyl) γ-phenoxypropoxyamine hydrochloride | 56 |
| 10 | N-benzyl γ-(p-chlorophenoxy)propoxyamine hydrochloride | 81 |
| 14 | γ-(p-Chlorophenoxy)propyl N-benzyl acethydroxamate | 77 |
| 15 | γ-phenoxypropyl N-γ-phenylpropyl carbomethoxyhydroxamate | 83 |

The active ingredients used in accordance with this invention are non-toxic in amounts required to effect significant reduction of blood cholesterol. In general, the daily dose for an average warm-blooded animal (e.g., about 150 pounds in weight) is between 50–3000 mg., and preferably, 200 to 1000 mg.

The aryloxyalkoxyamine compounds of the present invention which are novel compounds can be defined as having the general formula:

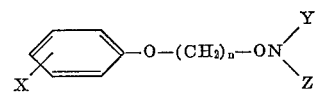

wherein X, $n$, Y and Z are as hereinbefore defined and wherein, when Y is hydrogen, Z is selected from the group consisting of aralkyl and aryloxyalkyl, and, when Z is hydrogen, Y is selected from the group consisting of

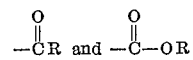

wherein R is as hereinbefore defined.

The following are specific examples describing the preparation of a representative number of the active ingredients of the invention.

EXAMPLE I

Preparation of γ-phenoxypropyl carbethoxyhydroxamate (Compound 4)

To a solution of sodium ethylate, prepared from 6.73 grams of sodium metal and 500 ml. of anhydrous ethanol, there was added 30.8 grams of N-hydroxy urethane and 63.0 grams of 3-bromopropyl phenyl ether. The mixture was refluxed for eight hours and a major portion of the solvent was subsequently removed by distillation until the temperature reached 85° C. The cooled residue was diluted with water and the aqueous mixture extracted with ether. The ether extract was washed with dilute sodium hydroxide until the color test with ferric chloride was negative, then with water until neutral, and the ether was removed. Fractional distillation of the residue yielded 30.8 grams of γ-phenoxypropyl carbethoxyhydroxamate having the following physical properties: B.P. 140° C./0.1 mm.; $n_D^{25}$ 1.5092; M.P. 43–46° C.

EXAMPLE II

Preparation of γ-phenoxypropyl N-benzyl carbethoxyhydroxamate (Compound 13)

To a solution of sodium ethylate prepared from 2.48 grams of sodium metal and 500 ml. of anhydrous ethanol there was added in succession 25.8 grams of the γ-phenoxypropyl carbethoxyhydroxamate prepared as described in Example I and 18.5 grams of benzyl bromide. The reaction mixture was maintained at room temperature for three hours and then heated to reflux for four hours. The ethanol was removed by distillation until the temperature reached 85° C. The cooled residue was diluted with water and the aqueous mixture extracted with ether. The ether extract was washed with dilute hydrochloric acid, then with water until neutral, and dried over sodium sulfate. The ether was removed and the residue distilled in vacuo. The yield of desired product was 24.3 grams.

EXAMPLE III

Preparation of N-benzyl γ-phenoxypropoxyamine hydrochloride (Compound 8)

A mixture comprising 12.5 grams of γ-phenoxypropyl-N-benzyl carbethoxyhydroxamate prepared as described in Example II, 3.1 grams of sodium hydroxide and 100 ml. of 50% aqueous ethanol was heated to reflux for one hour. The ethanol was removed by distillation until the temperature reached 90° C. and the cooled residue was extracted with ether. The extract was washed with water until neutral, dried over sodium sulfate and acidified with an excess of ethereal hydrochloric acid. The resulting precipitate was collected by filtration. The yield of the desired product was 7.2 grams.

EXAMPLE IV

*Preparation of γ-phenoxypropoxyamine hydrochloride (Compound 2)*

0.1 mole of γ-phenoxypropyl carbethoxyhydroxamate as prepared according to the method of Example I was subjected to alkaline hydrolysis as described in Example III. The resulting amine was converted to its hydrochloride salt as described in Example III; M.P. 118–120° C.

EXAMPLE V

*Preparation of γ-phenoxypropoxyamine hydrochloride (Compound 2)*

0.1 mole of N-hydroxy urethane was reacted with 0.1 mole of 3-bromopropyl phenyl ether as described in Example I. The reaction mixture was treated directly with aqueous sodium hydroxide and subjected to hydrolysis by refluxing for two hours. The resulting amine was isolated by extracting with ether and converting the amine to its hydrochloride salt by the addition of an equivalent quantity of anhydrous hydrogen chloride in anhydrous ether. The amine hydrochloride was purified by crystallization from methanol-ether solvent; M.P. 118–120° C.

EXAMPLE VI

*Preparation of β-(2,4-dichlorophenoxy)ethyl carbethoxyhydroxamate (Compound 3)*

The following materials were combined and refluxed for two hours: A solution of 11.5 g. of sodium in 500 ml. of ethanol, 51.5 g. of N-hydroxy urethane, and 135 g. of 2,4-dichlorophenyl β-bromoethyl ether. The ethanol was removed by distillation and the cooled residue diluted with water. An oil separated which was extracted with ether. The ether solution was dried and the solvent removed. The oily residue was dissolved in 50 ml. of trichloroethylene and hexane was added until crystallization occurred. The precipitate was collected and was purified by crystallization from ether-hexane. 48 g. of the desired compound was obtained; M.P. 67–68° C.

EXAMPLE VII

*Preparation of β-(2,4-dichlorophenoxy)ethoxyamine hydrochloride (Compound 1)*

A solution of 14.7 g. of β-(2,4-dichlorophenoxy)-ethyl carbethoxyhydroxamate and of 5.0 g. of sodium hydroxide in 100 ml. of 70% ethanol was refluxed for two hours. The ethanol was removed and the residue diluted with water. The mixture was extracted with ether and the ether solution dried over sodium hydroxide pellets. 25 ml. of 2 N-ethanolic hydrogen chloride was added and the precipitate was collected. Recrystallization from methanol-ether furnished 7.1 g. of the desired compound; M.P. 183–184° C.

EXAMPLE VIII

*Preparation of N-m-methylbenzyl β-(2,4-dichlorophenoxy)-ethoxyamine hydrochloride (Compound 7)*

The following materials were combined and refluxed for six hours: A solution of 1.2 g. of sodium in 150 ml. of ethanol, 14.3 g. of β-(2,4-dichlorophenoxy)ethyl carbethoxyhydroxamate, and 9.3 g. of m-xylyl bromide. A solution of 4.0 g. of sodium hydroxide in 70 ml. of water was added subsequently and refluxing carried out for two hours. The ethanol was removed and the cooled residue was extracted with ether. The solution was dried over sodium hydroxide pellets and 25 ml. of a 2 N ethereal hydrogen chloride solution added. The precipitate was collected and recrystallized from isopropanol to give 13.0 g. of the desired compound; M.P. 94–97° C.

EXAMPLE IX

*Preparation of N-benzyl γ-(p-chlorophenoxy)propoxyamine hydrochloride (Compound 10)* p-Chlorophenoxypropyl bromide and N-hydroxy urethane were converted to p-chlorophenoxypropyl carbethoxyhydroxamate following the procedure described in Example I. This compound was further alkylated using benzyl bromide, and the condensation product saponified without isolation, by refluxing with aqueous alkali as described in Examples II and III to give N-benzyl γ-(p-chlorophenoxy)propoxyamine. This compound was isolated in the form of its hydrochloride salt; M.P. 116–118° C.

EXAMPLE X

*Preparation of N-(γ-phenoxypropyl) γ-phenoxypropoxyamine hydrochloride (Compound 9)*

Two molar equivalents of 3-bromopropyl phenyl ether were added to a solution of one molar equivalent of N-hydroxy urethane and two molar equivalents of sodium ethylate in ethanol. The mixture was refluxed for two hours, and the product of this reaction was saponified by refluxing after the addition of aqueous sodium hydroxide. The ethanol was removed and the residue ether extracted. The ether extract was dried over sodium hydroxide and treated with one molar equivalent of ethereal hydrogen chloride. The precipitate which formed was collected and purified by crystallization from methanol-ether; M.P. 100–102° C.

EXAMPLE XI

*Preparation of γ-phenoxypropyl benzoylhydroxamate (Compound 5)*

16.7 g. of γ-phenoxypropoxyamine in 200 ml. of ether was treated with 0.1 mole of anhydrous pyridine and 0.1 mole of benzoyl chloride. The mixture was stirred at room temperature for about one hour then added to 25 ml. of water. The mixture was extracted with ether, the ether layer washed with dilute hydrochloric acid, dilute alkali and water. After drying over sodium sulfate, removal of the ether yielded 28 g. of the desired compound.

EXAMPLE XII

*Preparation of γ-(p-chlorophenoxy)propyl N-benzyl acethydroxamate (Compound 14)*

19.7 g. of N-benzyl N-γ-(p-chlorophenoxy)propoxyamine hydrochloride was stirred with 60 ml. of pyridine and 5.6 g. of acetyl chloride were added dropwise. The mixture was stirred at room temperature for two hours. Water was added and the mixture was extracted with ether. The ether solution was washed with dilute hydrochloric acid to remove excess pyridine and then with water until neutral. The ether was distilled and the oily residue was distilled in a molecular distillation unit. 15.7 g. of the desired compound was obtained, $n_D^{25}$ 1.5565.

The compounds prepared in the above examples possess the physical constants and give the analytical values which are tabulated in Table B, which follows.

TABLE B

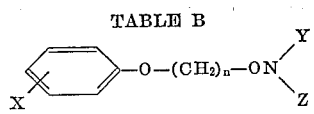

| No. | X | n | Y | Z | M.P., or B.P./mm. | Formula | Calculated C | H | N | Cl | Found C | H | N | Cl |
|---|---|---|---|---|---|---|---|---|---|---|---|---|---|---|
| 1 | 2,4-$Cl_2$ | 2 | H | H | 183–184 | $C_8H_{10}Cl_2NO_2$* | 37.16 | 3.90 | 5.42 | 41.14 | 37.19 | 3.99 | 5.50 | 41.20 |
| 2 | H | 3 | H | H | 118–120 | $C_9H_{14}ClNO_2$* | 53.07 | 6.93 | 6.88 | 17.41 | 53.12 | 7.03 | 7.04 | 17.40 |
| 3 | 2,4-$Cl_2$ | 2 | $COOC_2H_5$ | H | 67–68 | $C_{11}H_{13}Cl_2NO_3$ | 44.92 | 4.46 | 4.76 | 24.11 | 45.02 | 4.38 | 4.88 | 24.16 |
| 4 | H | 3 | $COOC_2H_5$ | H | 43–46 | $C_{12}H_{17}NO_4$ | 60.23 | 7.16 | 5.85 |  | 60.68 | 7.14 | 5.76 |  |
| 5 | H | 3 | $COC_6H_5$ | H | (a) | $C_{16}H_{17}NO_3$b | 70.83 | 6.32 | 5.16 |  | 70.72 | 6.19 | 5.11 |  |
| 6 | 3-$CH_3$ | 3 | H | Benzyl | >114/0.03 | $C_{17}H_{21}NO_2$c | 75.24 | 7.80 | 5.16 |  | 74.97 | 7.66 | 5.25 |  |
| 7 | 2,4-$Cl_2$ | 2 | H | 3-methylbenzyl | 94–96 | $C_{16}H_{18}Cl_3NO_2$* | 52.99 | 5.00 | 3.86 | 29.33 | 52.79 | 5.00 | 4.45 | 29.23 |
| 8 | H | 3 | H | Benzyl | 117–119 | $C_{16}H_{20}ClNO_3$* | 65.42 | 6.86 | 4.77 | 12.08 | 65.58 | 6.79 | 5.04 | 12.28 |
| 9 | H | 3 | H | γ-Phenoxypropyl | 100–102 | $C_{18}H_{24}ClNO_3$* | 63.99 | 7.16 | 4.15 | 10.49 | 64.14 | 7.22 | 4.16 | 10.46 |
| 10 | 4-Cl | 3 | H | Benzyl | 116–118 | $C_{16}H_{19}Cl_2NO_3$* | 58.54 | 5.83 | 4.27 | 21.60 | 58.67 | 5.76 | 4.26 | 21.61 |
| 11 | 3-$CH_3$ | 3 | $COOC_2H_5$ | do | 167/0.05 | $C_{20}H_{25}NO_4$d | 69.95 | 7.34 | 4.08 |  | 70.03 | 7.33 | 3.84 |  |
| 12 | H | 2 | $COOC_2H_5$ | do | 163/0.1 | $C_{18}H_{21}NO_4$e | 68.55 | 6.71 | 4.44 |  | 68.47 | 7.06 | 4.39 |  |
| 13 | H | 3 | $COOC_2H_5$ | do | 167/0.1 | $C_{19}H_{23}NO_4$f | 69.28 | 7.04 | 4.25 |  | 69.32 | 6.75 | 4.23 |  |
| 14 | 4-Cl | 3 | $COCH_3$ | do | >130/0.1 | $C_{18}H_{20}ClNO_3$g | 64.76 | 6.04 | 4.19 | 10.62 | 64.77 | 6.09 | 4.17 | 10.83 |
| 15 | H | 3 | $COOCH_3$ | γ-Phenylpropyl | >162/0.1 | $C_{20}H_{25}NO_4$h | 69.95 | 7.34 | 4.08 |  | 69.98 | 7.17 | 4.05 |  |
| 16 | H | 3 | $COOCH_3$ | H | 68.70 | $C_{11}H_{15}NO_4$ | 58.65 | 6.71 | 6.22 |  | 58.77 | 6.72 | 6.22 |  |

*Hydrochloride.  aUndistillable oil.  b$n_D^{24}$ 1.5739.  c$n_D^{25}$ 1.5510.  d$n_D^{25}$ 1.5312.  e$n_D^{25}$ 1.5388.  f$n_D^{25}$ 1.5335.  g$n_D^{25}$ 1.5565.  h$n_D^{25}$ 1.5332.

The following are examples of compositions formed in accordance with this invention which have the effect of lowering blood cholesterol upon administration to warm-blooded animals.

EXAMPLE A

A tablet is compressed from a composition having the following formula:

| | Mg. |
|---|---|
| γ-Phenoxypropoxyamine hydrochloride | 200 |
| Corn starch | 20 |
| Lactose | 20 |
| Magnesium stearate | 2 |
| Alginic acid | 4 |

EXAMPLE B

A tablet is compressed from a composition having the following formula:

| | Mg. |
|---|---|
| N-benzyl γ-phenoxypropoxyamine hydrochloride | 220 |
| Corn starch | 20 |
| Lactose | 70 |
| Magnesium stearate | 2 |
| Dicalcium phosphate | 50 |

EXAMPLE C

A tablet is compressed from a composition having the following formula:

| | Mg. |
|---|---|
| N-(γ-phenoxypropyl) γ-phenoxypropoxyamine hydrochloride | 400 |
| Corn starch | 25 |
| Lactose | 25 |
| Magnesium stearate | 40 |
| Alginic acid | 10 |

EXAMPLE D

A tablet is compressed from a composition having the following formula:

| | Mg. |
|---|---|
| N-benzyl γ-(p-chlorophenoxy)propoxyamine hydrochloride | 200 |
| Corn starch | 20 |
| Lactose | 20 |
| Magnesium stearate | 2 |
| Alginic acid | 4 |

EXAMPLE E 200 mg. of N-(p-chlorophenoxy)propyl N-benzyl acethydroxamate is mixed with 1.5 cc. of cottonseed oil and the resulting solution is encapsulated in a soft gelatin capsule.

The invention in its broader aspects is not limited to the specific steps, methods and compositions described but departures may be made therefrom within the scope of the accompanying claims without departing from the principles of the invention without sacrificing its chief advantages.

What is claimed is:

1. A method of reducing the blood cholesterol content of a warm-blooded animal which comprises administering internally to said animal a pharmaceutically effective amount of a compound selected from the group consisting of:

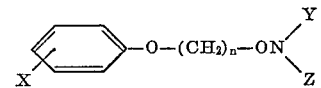

wherein X is selected from the group consisting of hydrogen, halogen and lower alkyl; n is an integer of 2 to 3; Y is selected from the group consisting of hydrogen,

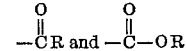

wherein R is selected from the group consisting of lower alkyl and phenyl; and Z is selected from the group consisting of hydrogen, phenylalkyl and phenoxyalkyl; and physiologically acceptable salts thereof.

2. The method of claim 1 wherein the compound is selected from the group consisting of γ-phenoxypropoxyamine and the hydrohalide thereof.

3. The method of claim 1 wherein the compound is selected from the group consisting of N-benzyl γ-phenoxypropoxyamine and the hydrohalide thereof.

4. The method of claim 1 wherein the compound is selected from the group consisting of N-γ-(phenoxypropyl) γ-phenoxypropoxyamine and the hydrohalide thereof.

5. The method of claim 1 wherein the compound is selected from the group consisting of N-benzyl γ-(p-chlorophenoxy)propoxyamine and the hydrohalide thereof.

6. The method of claim 1 wherein the compound is γ-(p-chlorophenoxy)propyl N-benzyl acethydroxamate.

7. The method of claim 1 wherein the compound is γ-phenoxypropyl N-γ-phenylpropyl carbomethoxyhydroxamate.

References Cited

UNITED STATES PATENTS

| | | | |
|---|---|---|---|
| 2,695,913 | 11/1954 | Block et al. | 260—471 |
| 2,816,059 | 12/1957 | Mills | 167—65 |
| 2,819,294 | 1/1958 | Plchukas | 260—471 |
| 2,830,008 | 4/1958 | Barber et al. | 167—65 |

ALBERT T. MEYERS, *Primary Examiner.*

JULIAN S. LEVITT, SAM ROSEN, *Examiners.*

V. C. CLARKE, *Assistant Examiner.*

UNITED STATES PATENT OFFICE
CERTIFICATE OF CORRECTION

Patent No. 3,342,678                          September 19, 1967

Frank M. Berger et al.

It is hereby certified that error appears in the above numbered patent requiring correction and that the said Letters Patent should read as corrected below.

Columns 7 and 8, TABLE B, sixth column, line 16 thereof, for "68.70" read -- 68-70 --; same table, seventh column, line 3 thereof, for "$C_{11}H_{13}Cl_2NO_3$" read -- $C_{11}H_{13}Cl_2NO_4$ --; same table, same column, line 8 thereof, for "$C_{16}H_{20}ClNO_3$" read -- $C_{16}H_{20}ClNO_2$ --; same table, under column "Analysis Found", column H, line 1 thereof, for "3.99" read -- 3.89 --; column 7, line 49, for "220" read -- 250 --.

Signed and sealed this 22nd day of October 1968.

(SEAL)
Attest:

Edward M. Fletcher, Jr.                      EDWARD J. BRENNER
Attesting Officer                             Commissioner of Patents